United States Patent [19]

Müller et al.

[11] Patent Number: 4,495,811
[45] Date of Patent: Jan. 29, 1985

[54] CORRELATION PROCEDURE AND DEVICE FOR ROTOR BALANCING

[75] Inventors: Michael Müller, Erzhausen; Alfred Giers, Rossdorf; Manfred Heiland, Darmstadt-Kranichstein, all of Fed. Rep. of Germany

[73] Assignee: Carl Schenck AG:, Fed. Rep. of Germany

[21] Appl. No.: 481,903

[22] Filed: Apr. 4, 1983

[30] Foreign Application Priority Data

Apr. 8, 1982 [EP] European Pat. Off. ........ 82103027.7

[51] Int. Cl.³ .............................................. G01M 1/22
[52] U.S. Cl. ........................................ 73/462; 73/477
[58] Field of Search ................. 73/462, 471, 473, 475, 73/476, 477, 66

[56] References Cited

U.S. PATENT DOCUMENTS

| | | | |
|---|---|---|---|
| 1,447,985 | 3/1923 | Hutchinson | 73/477 |
| 3,071,972 | 1/1963 | Koenig | 73/462 |
| 3,644,042 | 2/1972 | Kolb et al. | 73/655 |
| 3,754,801 | 8/1973 | Giers et al. | 308/15 |
| 3,910,121 | 10/1975 | Curchod et al. | 73/462 |

OTHER PUBLICATIONS

Disa Elektronik GmbH, Publication No. 1206E, Nov. 1981, Entitled "55X—Laser Doppler Vibrometer System—Variation Studies".

Primary Examiner—James J. Gill
Attorney, Agent, or Firm—Connolly and Hutz

[57] ABSTRACT

A procedure and a device are provided for determining the correlation between the unbalance of a rotor in at least one correction plane thereof and the measurement signal generated by such unbalance at one or more of the rotor supports. The vibration signals of the rotor are measured at different bearing support stiffness.

9 Claims, 3 Drawing Figures

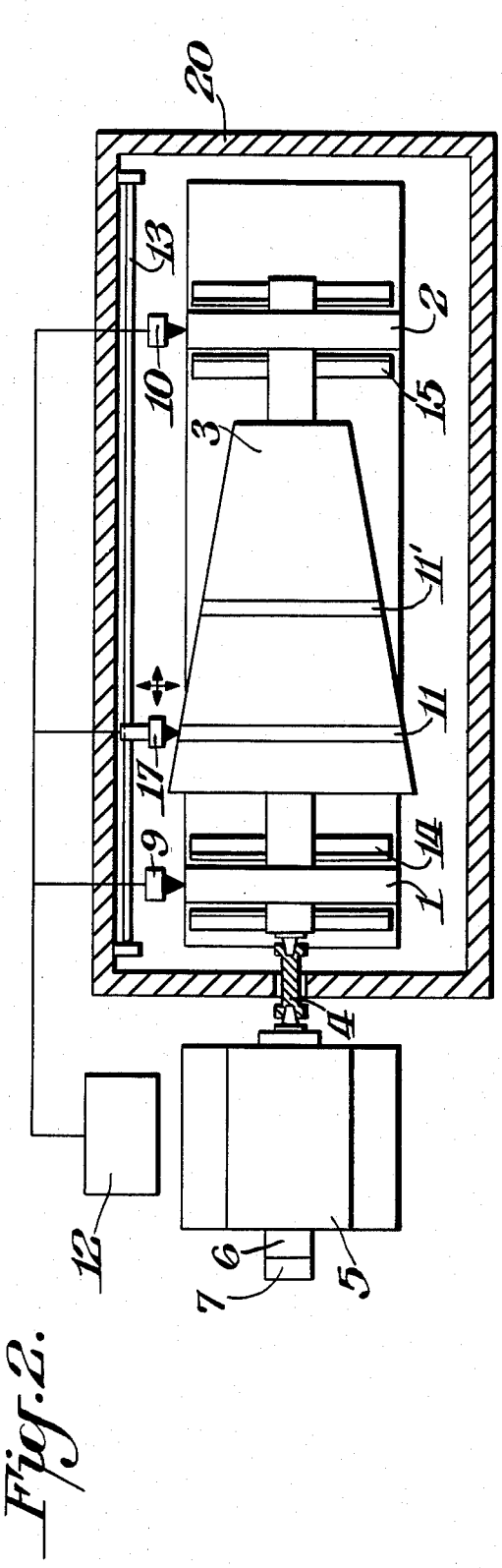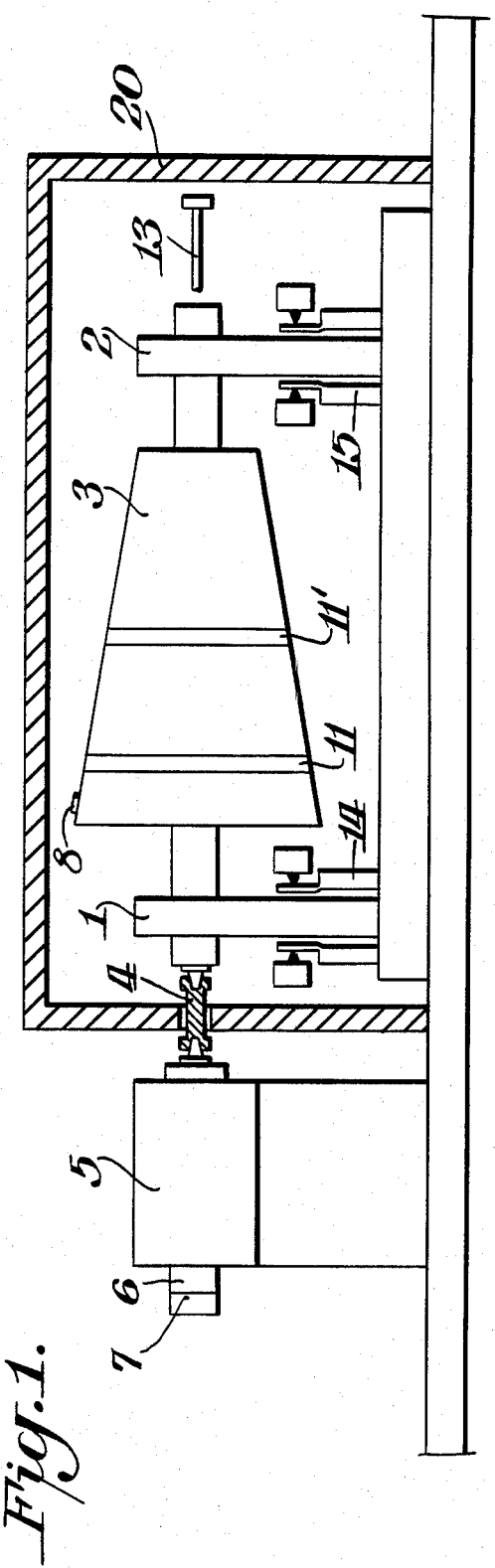

CORRELATION PROCEDURE AND DEVICE FOR ROTOR BALANCING

BACKGROUND OF THE INVENTION

The invention concerns a procedure and a device for determination of the correlation between an unbalance in at least one correction plane of a rotor and a measurement signal generated thereby on at least one support, particularly of a balancing machine.

For balancing of a rotor, the correlation must be known between the unbalance in the correction planes of the rotor and the measurement signals generated by this unbalance at the supports. Hitherto, this correlation, for example, has been established in that first, the vibrations of the unbalanced rotor have been measured on the bearings at the balancing speed. Thereafter, the rotor is stopped, a test unbalance of defined magnitude is applied in first correction plane, and the vibrations are again measured at the bearings of the rotor. From the magnitude of the test unbalance and the resulting change in the vibration at the bearings, the unbalance in the first correction plane can be determined. This procedure is then repeated for the second and all additional correction planes. This procedure is time-consuming and costly, since a new test run must be completed for each correction plane.

SUMMARY OF THE INVENTION

Accordingly, it is an object of the present invention to provide a simple and cost effective procedure and device for determining the correlation between the unbalance of a rotor in at least one correction plane thereof and the measurement signal generated by such unbalance at one or more of the rotor support bearings.

With this background, the purpose of the invention herein is to rapidly and precisely establish the effect of the unbalance in the correctio plane on the bearings, without any known data about the rotor to be balanced. For determination of the correlation, no more than one single balancing speed and one single measuring run is required, even when a number of correction planes and bearing locations are to be considered. One further inventive execution shows that the unbalance can also be determined at several speeds without interruption of the measuring run, by means of a change of the balancing speed. Also, the procedure of the present invention offers a solution in those cases where the correction planes of the rotor are not accessible for the measurement. The procedure also includes the method of determining the corrections to be made in the correction planes.

A device for the execution of the procedure comprises a balancing machine with at least one tunable support for accommodation of a rotor to be investigated. The device also includes a drive, and an angular position indicator. Several movable vibration pick-ups may be positioned at various points along the rotor. A device according to the invention for evaluation of the electrical signals derived from the mechanical vibrations may be equipped with analog or digital components or a combination thereof, both in the evaluation portion and in the indicator portion. The invention extends to both hard and soft bearing balancing machines, and in particular, it includes the area of flexible rotors.

BRIEF DESCRIPTION OF THE DRAWING

Novel features and advantages of the present invention in addition to those mentioned above will become apparent to those skilled in the art from a reading of the following detailed description in conjunction with the accompanying drawing wherein:

FIG. 1 is a side elevational view of a balancing device according to the present invention for use in carrying out a balancing procedure;

FIG. 2 ia a top plan view of the balancing device shown in FIG: 1; and

DETAILED DESCRIPTION OF THE INVENTION

Figure 3:
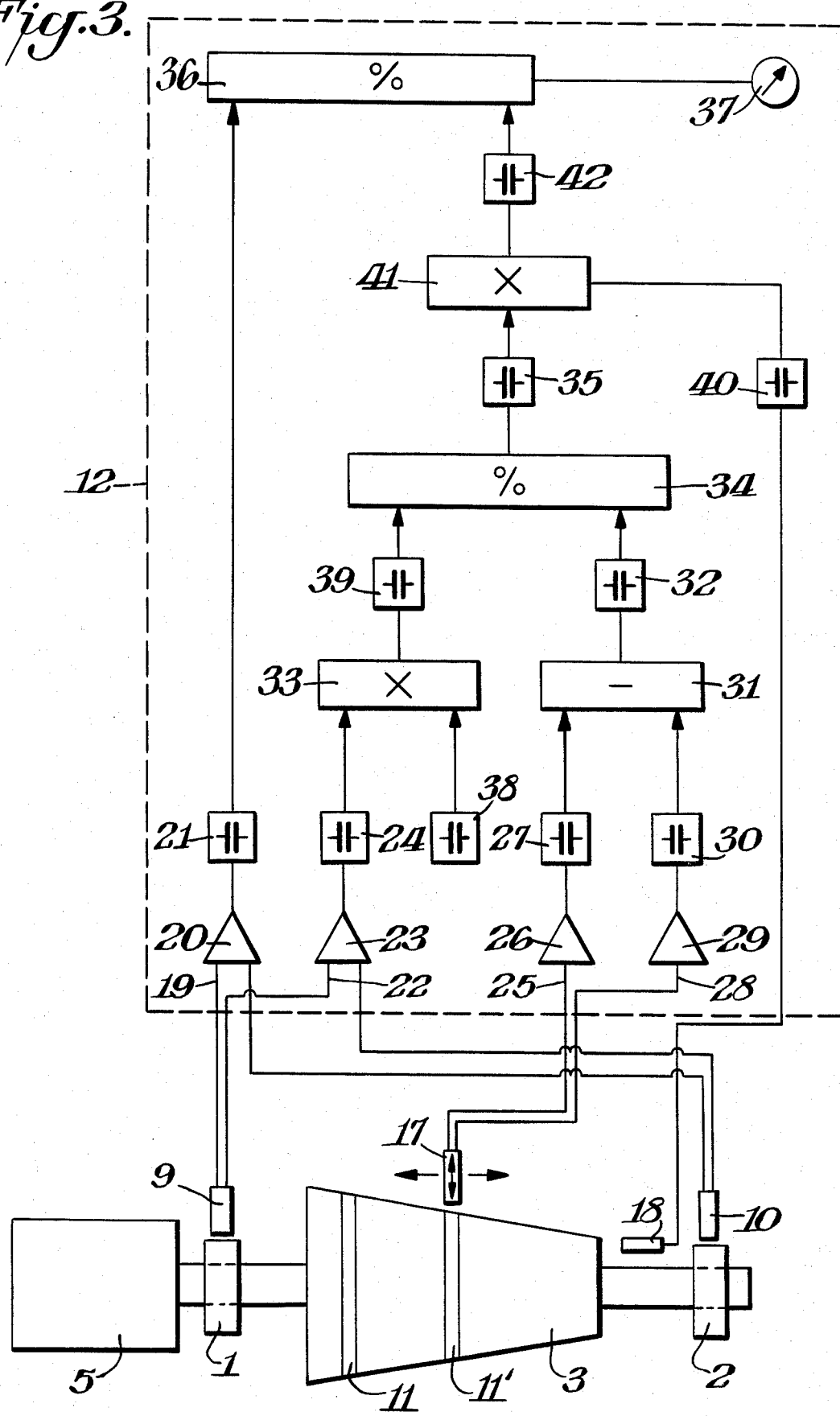
FIG. 3 is a schematic block diagram of an evaluation device according to the invention.

As shown in FIGS. 1 and 2, rotor 2 resting in two balancing machine bearing supports 1, 2 is driven by an electrical motor 5 over a drive shaft 4. A phase generator 6 and a revolution counter 7 are coupled to the electrical motor. The electrical motor may also be equipped with a gear unit (not shown) if desired. Instead of the drive shaft, the rotor 3 can also be driven by a belt drive (not shown), whereby a marking 8 on the rotor may serve as a phase reference point. On the bearing supports 1 and 2, vibration pick-ups 9, 10 are arranged, which convert the vibrations of the bearing supports 1, 2, caused by the unbalance, into electrical signals. These electrical signals are then forwarded to a evaluation unit 12, as explained more fully below.

An additional vibration pick-up 17 is located on a guide 13 that runs generally parallel to the axis of the rotor, as shown in FIGS. 1 and 2. The pick-up 17 may be moved along the guide 13 and locked in place thereon so that vibrations of the rotor 3 may be measured at correction planes such as 11, 11', for example. These measurement signals are also fed into the evaluation unit 12.

The dynamic stiffness of the supports 1 and 2 can be tuned by means of a device 14,15. The tuninng takes place by adding or removing an elastic spring or a damper, or by changing the co-oscillating bearing mass, whereby each action can be taken singly or in combination with others, see for example U.S. Pat. No. 3,754,801, the disclosure of which is incorporated herein by reference. By means of a vacuum chamber 20, it is indicated that this procedure can be executed in a vacuum as well.

The inventive procedure, which is expressed in the formula below, will now be explained with reference to FIGS. 1 and 2

$$a_{ij} = \frac{S_{iB} - S_{iA}}{(C_A - C_B) \cdot S_{jB}} \cdot \Omega^2$$

In the above formula,
  $a_{ij}$=Quotient that describes the correction between the unbalance in the plane i and a measurement signal caused in the support j by the unbalance;
  $S_i$=the deflection or displacement of the rotor in the plane i;
  B=the condition after the tuning of the support;
  A=the condition prior to the tuning of the support;
  C=dynamic bearing stiffness of the support;
  $S_j$=deflection on the tuned support;
  $\Omega$=rotational or angular frequency.

First, the rotor 3 is placed in bearings on the balancing machine supports 1, 2 and then coupled to the drive motor 5 by means of the drive shaft 4. Then, the rotor is brought up to the speed that is preset on the revolution counter 7. By means of the vibration pick-up 17, the vibrations of the rotor 3 in its correction planes 11, 11' are converted into electrical signals and fed into the evaluation unit 12. Then, on the left support 1, the stiffness is changed by means of the device 14, and the vibrations of the rotor 3 are again measured in the correction planes 11, 11'. In addition, the vibrations of the left support 1 are measured. All measurement signals are fed into the evaluation unit 12.

The interpretation of these signals results in the correlation between an unbalance in the correction plane 11 and the vibration it generates in the unchanged support, as a quotient of difference between the vibrations in the correction plane with changed and unchanged stiffness and vibrations in the bearing with changed stiffness; the whole is then also divided by the difference of the dynamic stiffnesses of the changeable support. This evaluation is performed in the evaluation unit 12, as explained below. After the unbalance in the left support has been determined, the change of the left support is cancelled, and the procedure is then repeated for the second support. If the unbalance effect is also to be determined for different speeds, other speeds can be run and the measurements can be performed at these.

Several deflections or displacements may be measured around the correction planes at axial distances from the correction plane. The deflection in the correction plane may then be interpolated from the several deflections so measured.

The circuit diagram represented in FIG. 3 shows the electrical processing of the obtained information. The processing and indication of the measuring values can be either analog or digital. A speed monitoring device 18 ascertains that the once preset speed remains constant during the input of the measuring values. The signals for the vibrations of the untuned support coming from the vibration pick-up 9 are filtered and fed via a line 19 into an amplifier 20, and then as vector quantities, into a memory 21 where they are stored for later processing. The signals for the vibrations of the rotor 3 in a correlation plane 11 at untuned stiffness are also fed from the pick-up 17 via a line 25 and an additional amplifier 26 into a holding memory 27. Then, the stiffness of the left support is changed and the bearing vibrations are fed via a line 22 and yet another amplifier 23 to an additional holding memory 24. The vibrations of the rotor in its correction plane with changed bearing stiffness are fed via a line 28 and a voltage amplifier 29 into a value storage 30.

By means of a differential circuit 31, the signals from the holding memory 27 and the value storage 30 are then subtracted from one another and the result is stored in a differential memory 32. Similarly, the value from the additional holding memory 24 is multiplied by means of a multiplier 33 with the factor of the difference of the dynamic stiffnesses which is stored in a factor memory 38. The result is stored in a succeeding memory 39. A division circuit 34 now forms the quotient of the values stored in the succeeding memory 39 and the differential storage 32, and stores it in a results memory 35. This value is multiplied in another multiplier circuit 41 with the information from the monitoring device 18 concerning the rotational frequency, which has been raised to the second power and stored in a rotational frequency memory 40. The product is stored in a final memory 42. By means of an additional division circuit 36, the quotient of the values stored in the memory 21 and the final memory 42 is formed and represented on an indicator 37 as correction to be made in the correction plane according to magnitude and angle. Instead of the indicator, a processing device can also be connected which directly eliminates the existing unbalance in the rotor.

The block diagram described with reference to FIG. 3 shows, in its simplest execution, the evaluation of the measuring values for only one measuring plane and only one tunable bearing. However, it can be seen without difficulty that if there are several of these circuit devices, several supports and several correction planes can be considered. By means of multiplex circuitry with one single such circuit device, it is also possible to evaluate and indicate the measuring values of a rotor resting in two tunable balancing machine bearings which, for example, being a flexible rotor, has five correction planes, or, to hold the measuring values in a memory unit arranged after the indicator for later elimination of unbalance in the individual planes and to maintain their availability there.

For the first time, this invention suggests the innovative significance of the application for balancing purposes of laser devices, known per se for measurement of distances. Laser devices such as disclosed in Disa Elektronik GmbH, Publication No. 1206E, November 1981, entitled "55X—Laser Doppler Vibrometer System—Variation studies" may be used as the vibration pick-ups.

What is claimed is:

1. A procedure for determining the correlation between an unbalance in at least one correction plane of a rotor and a measuring signal generated thereby on at least one support for a rotor, particularly of a balancing machine, characterized thereby, that particularly on a flexible rotor, the deflection of the rotor is first measured at the balancing speed at one correction plane of the rotor, whereafter the vibration characteristics of at least one support are tuned and the vibrations of the rotor are measured again in the at least one correction plane and additionally at the tuned support, and that thereafter, the correlation between the unbalance and the measuring signal is described by means of the quotient derived from the difference of the deflections of the rotor in the at least one correction plane with tuned and untuned support, multiplied by the rotational frequency to the second power and divided by the product of the deflection of the tuned at least one support and a factor describing the tuning.

2. A procedure according to claim 1, characterized thereby that the tuning of the at least one support is executed at at least one balancing speed during the measurement run.

3. A procedure according to claim 2, characterized thereby that around the at least one correction plane, several deflections are measured at axial distances from it, and that the deflection in the correction plane is interpolated from these measurements.

4. A procedure according to claim 1, characterized thereby that around the at least one correction plane, several deflections are measured at axial distances from it, and that the deflection in the correction plane is interpolated from these measurements.

5. A procedure according to claim 1 for determination of the unbalance of the rotor according to position and magnitude, characterized thereby that the inverse value of the quotient is multiplied by the measuring value describing the deflection of the untuned at least one support.

6. A device for determining the correlation between a rotor unbalance at a correction plane thereof and the measuring signal generated thereby on at least one of the rotor supports of a balancing machine consisting of at least one tunable support for accommodation of the rotor to be investigated, a drive and an angle position indicator, characterized in that the device includes at least one pick-up movable in the axial direction of the rotor for measuring the vibrations of the rotor at a correction plane and for measuring the vibrations of at least one rotor support, means for tuning the at least one rotor support, and means for determining a quotient representative of the correlation between the unbalance and the measuring signal, the quotient being derived from the difference of the deflections of the rotor in the at least one correction plane with tuned and untuned support, multiplied by the rotational frequency to the second power and divided by the product of the deflection of the tuned at least one support and a factor describing the tuning.

7. A device as in claim 6 characterized in that the device includes several vibration pick-ups and means for positioning at least one pick-up along the rotor in the axial direction thereof.

8. A device as in claim 6 characterized thereby that an additional vibration pick-up is permanently located at each measuring plane of the rotor.

9. A device as in claim 6 characterized thereby that the vibrations of the rotor on at least one tunable support and/or at one correction plane are measured by at least one laser measurement device.

* * * * *